United States Patent Office 2,785,053
Patented Mar. 12, 1957

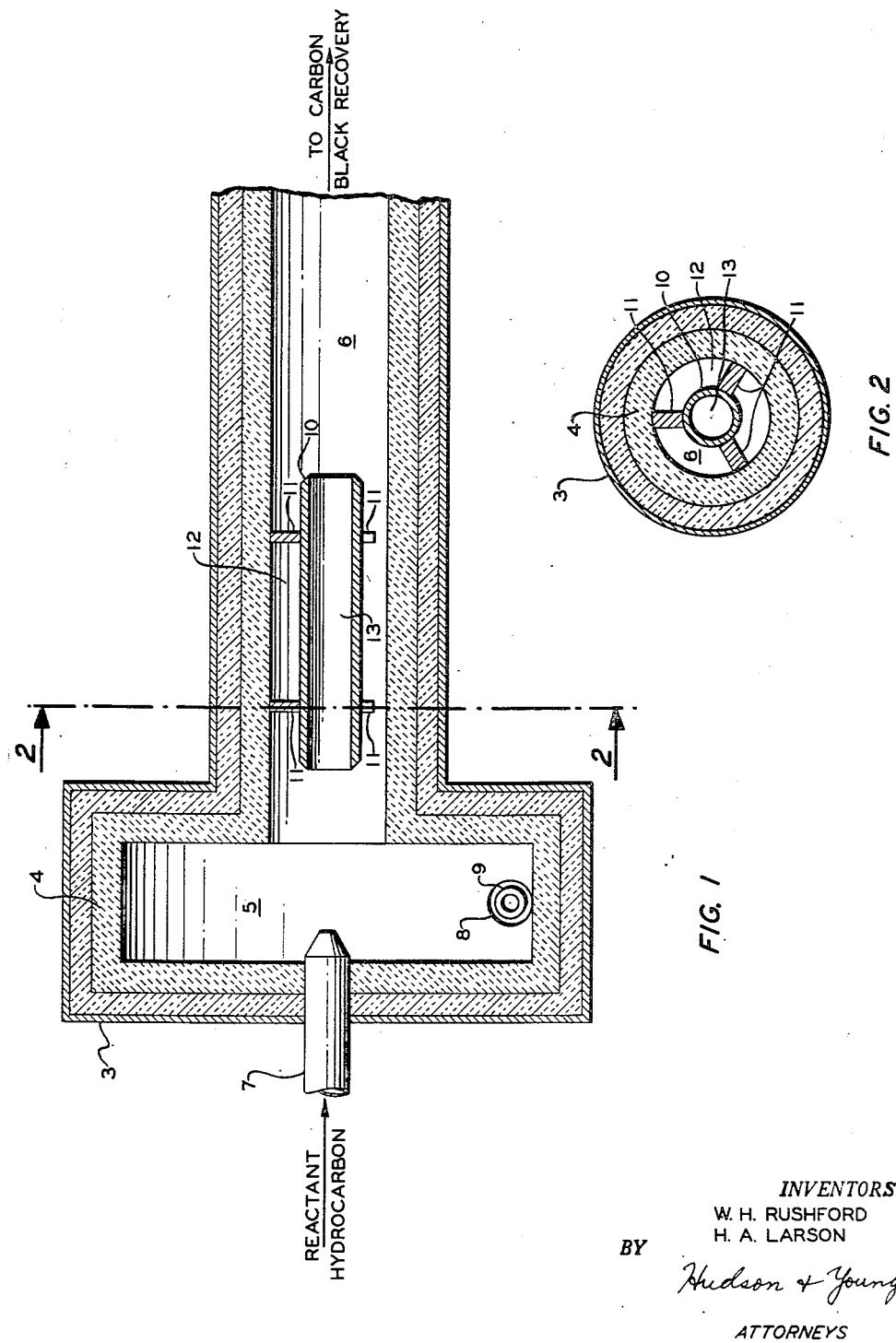

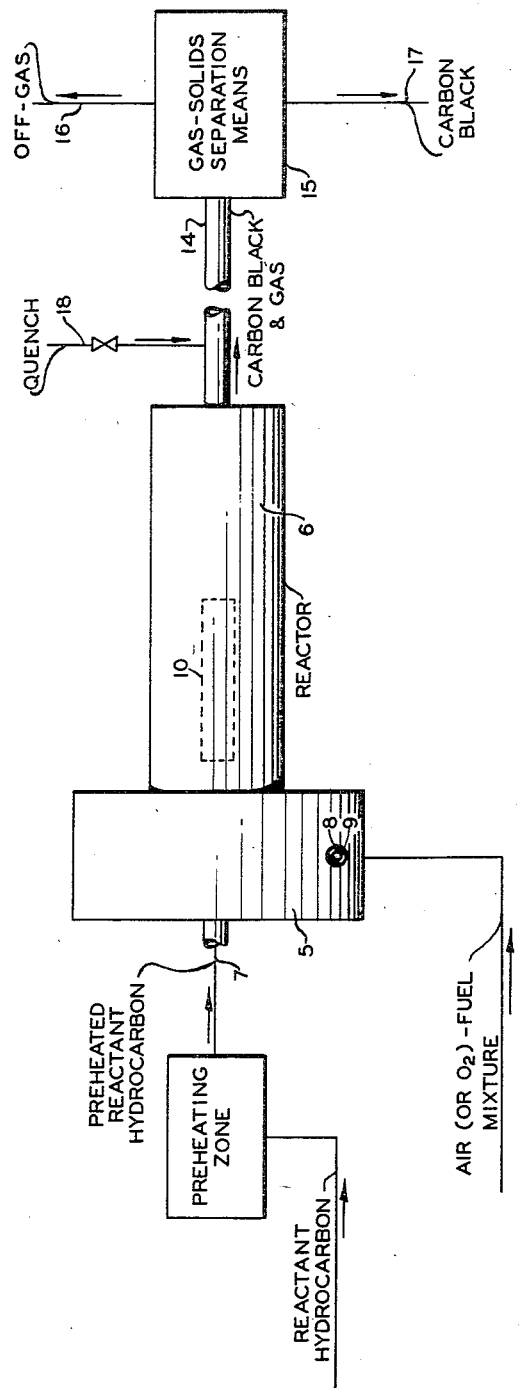

2,785,053

PROCESS AND APPARATUS FOR PRODUCTION OF CARBON BLACK

Harold A. Larson and Wilson H. Rushford, Borger, Tex., assignors to Phillips Petroleum Company, a corporation of Delaware Application November 13, 1953, Serial No. 391,965

13 Claims. (Cl. 23—209.4)

This invention relates to a novel method for the production of carbon black in high yield. In another aspect, it relates to a novel apparatus for the production of carbon black, said apparatus having an increased radiant surface area. In another aspect, the invention relates to a method and an apparatus for increasing the yield of high quality carbon black. In another aspect, the invention relates to a novel carbon black production apparatus providing increased radiant surface area without an undesirably high pressure drop. In another aspect, the invention relates to an apparatus for the production of carbon black, said apparatus having a cylindrical refractory member placed within the reaction section.

It has been found in the prior art that high-grade carbon black can be produced by introducing a reactant hydrocarbon, preferably in vapor form, into the interior of a helically moving sheath of hot combustion gas, and by directly transferring heat from said combustion gas to said reactant hydrocarbon and thus heating said hydrocarbon to a carbon black forming temperature. Examples of such processes and apparatus pertaining thereto are described in Krejci Patents U. S. 2,564,700 (1951), 2,375,795, 2,375,796, 2,375,797 and 2,375,798 (1945). The type of process described in these patents has enjoyed great commercial success because of its capacity to produce high-quality carbon black in high yields. Efforts are constantly being made, however, to improve the yields from this and other types of carbon black processes.

This invention provides a process and an apparatus whereby the yield of carbon black from a process of the type described in the above-cited patents is substantially increased and the quality of the carbon black is maintained.

According to this invention, a reactant hydrocarbon, heated to a carbon black forming temperature by direct contact with a helically traveling sheath of hot combustion gas, is divided into two portions, one portion encompassing the other; one of the portions is passed along the exterior of a substantially tubular radiant surface and the other is passed along the interior of a substantially tubular radiant surface, carbon black being thereby formed; and carbon black is recovered from the resulting mixture.

Further, according to this invention, there is provided a carbon black production reactor comprising a substantially cylindrical reaction chamber, inlet means substantially axially disposed at one end of said reactor, inlet means substantially tangentially positioned with respect to an inner wall of said reactor in open communication with said reaction chamber, carbon black recovery means in open communication with said reactor at the end thereof opposite the axially positioned inlet means, and a substantially tubular refractory member positioned in said reaction chamber at a point downstream from said tangentially positioned inlet means. Thus, according to one modification of this invention, there is provided, in a reactor of the tangential flame type, a substantially cylindrical refractory tube positioned within the reaction chamber of said reactor, whereby increased radiant surface area is provided.

According to one modification of the invention, there is provided, in a carbon black reactor comprising a substantially cylindrical combustion chamber positioned coaxially and in open communication with an adjacent substantially cylindrical reaction chamber having a smaller diameter than said combustion chamber, a substantially cylindrical refractory member longitudinally positioned within said reaction chamber. This type of reactor, which is also provided with tangential inlets for fuel and oxidizing gas, is described in Krejci Patent 2,564,700 (1951).

One embodiment of the invention in connection with a carbon black reactor of the precombustion type is diagrammatically illustrated in the drawings.

Figure 1 is a sectional side elevation of a reactor according to this invention.

Figure 2 is a cross-sectional view taken through line 2—2 of Figure 1.

Figure 3 is a self-explanatory flow sheet of a process according to this invention.

As shown in Figures 1 and 2, the reactor comprises an outer shell 3 provided with a refractory lining 4. Also provided is a cylindrical combustion chamber 5 provided with one or more inlets 8 which are tangentially positioned with respect to the interior surface of chamber 5. Within inlet 8 is positioned an orifice-tipped burner means 9. Hydrocarbon inlet 7 is positioned to extend through the end wall of chamber 5 and is substantially coaxial with respect to chamber 5. Reaction chamber 6 is positioned adjacent and in open communication with chamber 5 and has a smaller diameter than chamber 5. Combustion chamber 5 preferably has a diameter greater than its length, and reaction chamber 6 preferably has a length greater than its diameter.

In the operation (see Figure 3) of a furnace or reactor of the type described, a combustible mixture of the fuel and an oxidizing gas, such as oxygen or air, is directed into burner 9 at a high velocity. Combustion of the fuel takes place within inlet 8 and/or within the periphery of chamber 5, the combustion gas so produced moving in a spiral path toward the axis of chamber 5. Combustion of the fuel is substantially complete within the peripheral part of chamber 5 or within inlet 8. The temperature in combustion zone 5 is ordinarily about 3000° F. Combustion gas from chamber 5 passes into reaction chamber 6 and moves longitudinally in a helical path along the walls of chamber 6. A preheated reactant hydrocarbon is introduced through inlet 7 and passes into the interior of the helical sheath of combustion gas traveling through reaction chamber 6. Heat is transferred from the hot combustion gas directly to the vaporized hydrocarbon. The reactant hydrocarbon is thus rapidly heated to a carbon black forming temperature, e. g. 2600° F., and is converted to carbon black in reaction chamber 6. A mixture of combustion gas and suspended carbon black is withdrawn from chamber 6 through pipe 14 and passes to carbon black recovery means 15, of any suitable type known in the art. The effluent mixture is cooled in pipe 14 to below reaction temperature, e. g. below 1000° F., by water quench 18 and/or indirect or atmospheric cooling of pipe 14. Separation means 15 can include one or more cyclone separators, electrostatic precipitators, and/or filters. Off-gas is withdrawn through outlet 16 and product carbon black through outlet 17.

According to this invention, there is positioned longitudinally within reaction chamber 6 a refractory cylindrical tube 10 which is open at both ends and which is supported in spaced relationship with respect to the walls of chamber 6 by means of supports 11 (Figures 1 and 2)

which can be positioned in any desired arrangement. Supports 11 can be of any suitable refractory material such as alumina, zirconia, etc. The supports 11 can be of the same material as tube 10 or a different refractory material.

Tube 10 is heated to incandescence by contact with the helically moving blanket of combustion gases in reaction chamber 6, thus providing increased radiant surface which transfers additional heat to the reactant hydrocarbon. The reactant hydrocarbon flows through the interior and along the exterior of tube 10.

Cylindrical tube 10 can be of any desired cross-sectional shape, such as elliptical or circular. It is preferred that the cross-section be of substantially the same shape as the cross-section of reaction chamber 6 and that the cross-section of both reaction chamber 6 and tube 10 be substantially circular. It is further preferred that tube 10 be positioned so as to be coaxial with reaction chamber 6 and combustion chamber 5; however, tube 10 can be laterally displaced so that the cross-section thereof is slightly eccentric with respect to the cross-section of chamber 6, but it is preferred that the axis of tube 10 be parallel or coincident with the axis of chamber 6. It is further preferred that tube 10 and chamber 6 be substantially coaxial.

The upstream end of tube 10 should be remote from the inlet end of reaction chamber 6, i. e. the upstream end of tube 10 should be displaced in a downstream direction from the inlet end of chamber 6 so that direct contact between the helically moving combustion gas and the axially introduced reactant hydrocarbon can take place before the hydrocarbon reaches tube 10. It is preferred that the upstream end of tube 10 be positioned downstream from the inlet end of chamber 6 by from 3 to 10% of the length of chamber 6. The downstream end of tube 10 can extend to the downstream end of chamber 6 if desired; however, in most cases, it is unnecessary that tube 10 extend that far.

It is preferred, when the internal diameter of chamber 6 is less than 6 inches, that the total inside and outside surface area of tube 10 plus the inside surface area of recation chamber 6 be from 1.25 to 1.50 times the volume of chamber 6 per foot of length thereof. When the internal diameter of chamber 6 is 6 inches or greater, it is preferred that the total internal and external surface area of tube 10 plus the inside surface area of chamber 6 be from 0.8 to 1.0 times the volume of chamber 6 per foot of length thereof.

From Figure 2, it is seen that tube 10 divides the cross-section of chamber 6 into an annular zone 12 and a central zone 13. It is preferred that the ratio of the cross-sectional area of the annulus 12 to the cross-sectional area of the central portion 13 be in the range 0.5:1 to 3:1.

This invention can also be practiced in connection with a carbon black furnace of the tangential flame type having no enlarged precombustion section (see Patent 2,375,795).

EXAMPLE

A reactor of the type shown in Figure 1 was constructed utilizing a cylindrical radiant member according to this invention. The combustion chamber of this reactor was 33 inches in diameter and 12 inches in length and was provided with two tangential inlets spaced 180° apart. The reaction section of the reactor was 12 inches in internal diameter and 11 feet in length. Positioned within the reaction section was a cylindrical Carbofrax (trade name) tube having an external diameter of 8½ inches, an internal diameter of 6½ inches and a length of 21 inches. The upstream end of this tube was positioned 6 inches downstream from the inlet of the reaction section. The tube was positioned coaxially with respect to the common axis of the combustion chamber and the reaction chamber.

A fuel gas, comprising principally methane, and air was passed into the combustion chamber through the tangential inlets, the fuel being substantially completely burned at the periphery of the combustion chamber. A highly aromatic recycle gas oil having a Bureau of Mines correlation index of 88 was passed axially into the combustion chamber and subsequently into the reaction chamber. The effluent from the reaction chamber was quenched with water and the product carbon black was collected. The oil was charged to the reactor at a rate of 193 gallons per hour. Air was supplied to the tangential inlets at a rate of 120,000 standard cubic feet per hour. Fuel gas was supplied at a rate of 8,200 standard cubic feet per hour. The yield of carbon black per gallon of oil charged was 4.15 pounds.

In a second run in which the same type of furnace is used, but without a cylindrical refractory tube according to this invention and in which the same oil is used as a reactant under substantially the same conditions, the yield of carbon black is 3.84 pounds per gallon of oil.

From the foregoing, it is evident that the process and apparatus of this invention produced an increase in the yield of carbon black of 8%.

Samples of the carbon black prepared according to this invention and samples prepared without the use of the refractory cylindrical member without the use of this invention were compounded with butadiene-styrene synthetic rubber and the compounded rubber was evaluated. The results are shown in Tables I and II below.

*Table I*

RUBBER CONTAINING CARBON BLACK PREPARED ACCORDING TO THIS DIVISION

| Minutes Cure at 307° F. | 300% Modulus, p. s. i. | Tensile, p. s. i. | Elongation, percent | Resilience, percent | Abrasion Loss, grams | | Compression Set, percent | Compounded, MS-1½ |
|---|---|---|---|---|---|---|---|---|
| | | | | | orig. | aged | | |
| 20 | 1,110 | 2,740 | 535 | 58.7 | | | 31.1 | 31.5 |
| 30 | 1,220 | 2,800 | 515 | 59.8 | 9.41 | 7.10 | 17.3 | |
| 45 | 1,220 | 2,770 | 505 | 59.4 | | | 9.8 | |

*Table II*

RUBBER CONTAINING CARBON BLACK PREPARED WITHOUT THE REFRACTORY CYLINDER OF THIS INVENTION

| Minutes Cure at 307° F. | 300% Modulus, p. s. i. | Tensile, p. s. i. | Elongation, percent | Resilience, percent | Shore Hardness | Abrasion Loss, grams | | Compression Set, percent | Compounded MS-1½ |
|---|---|---|---|---|---|---|---|---|---|
| | | | | | | orig. | aged | | |
| 20 | 1,130 | 2,825 | 560 | 57.5 | 52 | | | 31.3 | 32 |
| 30 | 1,320 | 3,270 | 590 | 59.1 | 53 | 9.99 | 7.37 | 17.3 | |
| 45 | 1,300 | 3,030 | 530 | 58.9 | 54 | | | 9.8 | |

The above-mentioned rubber samples were prepared from the following recipe:

RECIPE GRS-1000

| Ingredient: | Parts by weight |
|---|---|
| Rubber (butadiene-styrene) | 100 |
| Carbon black | 40 |
| Zinc oxide | 3 |
| Sulfur | 1.75 |
| BRT #7 [1] (softener) | 6 |
| Santocure [2] (accelerator) | 0.8 |

[1] A refined tar with a high free-carbon content. Sp. gr. 1.20–1.25.
[2] N-cyclohexyl-2-benzothiozolesulfenamide.

The foregoing data show that the properties of rubber compounded with carbon black prepared according to this invention compare favorably with those of rubber compounded with carbon black prepared by a prior art process.

Variation and modification are possible within the scope of the disclosure and the claims to this invention, the essence of which is that there has been provided an improved carbon black production process wherein hydrocarbon gases heated to a carbon black forming temperature are divided into two parts, one part encompassed within the other, said one part being passed along the interior of a radiant tubular surface, the other part being passed along the exterior of a radiant tubular surface, and the carbon black so formed is recovered; and that there has been provided a reactor for the production of carbon black comprising a tangential flame type carbon black reactor, in the reaction section of which is substantially longitudinally positioned a substantially tubular refractory member. Thus, the cross-section of the tubular member can be circular, elliptical, rectangular, or triangular.

While certain process steps, structures, and examples have been described for purposes of illustration, the invention is clearly not limited thereto.

We claim:

1. A process which comprises forming a substantially helically traveling sheath of hot combustion gas, introducing a reactant hydrocarbon into the interior of said sheath, heating said hydrocarbon to a carbon black forming temperature by virtue of heat directly imparted by said combustion gas, dividing a resulting mixture into two portions, one portion encompassed within the other, passing said one portion along the inner part of a substantially tubular radiant surface, passing said other part along the exterior of said substantially tubular radiant surface, whereby carbon black is formed by pyrolysis of said hydrocarbon, and recovering said carbon black.

2. A process which comprises introducing a combustible mixture of fuel and oxygen containing gas tangentially into a substantially cylindrical combustion zone; substantially completely reacting said mixture by combustion in a peripheral part of said combustion zone, passing thus formed combustion gas along an inward spiral path within said combustion zone; directing said gas longitudinally in a helical path along the periphery of a substantially cylindrical reaction zone having a smaller diameter than said combustion zone; axially introducing a reactant hydrocarbon into said combustion zone and subsequently into said reaction zone, whereby heat is directly transferred from said combustion gas to said hydrocarbon and said hydrocarbon is heated to a carbon black forming temperature; dividing a resulting mixture into two portions, one encompassed within the other; passing said one portion along the interior of a substantially cylindrical radiant surface; passing said other portion along the exterior of said substantially cylindrical radiant surface; recovering an effluent from said reaction zone; and recovering carbon black from said effluent.

3. In a carbon black production reactor, comprising a substantially cylindrical reaction chamber, inlet means substantially tangentially positioned with respect to an inner wall of said reactor and in open communication with said chamber, substantially axial inlet means in open communication with said chamber at one end of said reactor and outlet means in communication with said reactor at the opposite end thereof, the improvement which comprises, in combination, a substantially tubular refractory member longitudinally positioned within said reaction chamber and spaced from the walls thereof, said member having open ends, the end nearest said tangential inlet means being longitudinally remote, in the direction of said outlet means, from said tangential inlet means.

4. A carbon black production reactor comprising, in combination, a substantially cylindrical combustion chamber coaxially positioned adjacent and in open communication with a substantially cylindrical reaction chamber having a smaller diameter than said combustion chamber; inlet means tangentially positioned with respect to the interior surface of said combustion chamber; substantially axially positioned inlet means in said combustion chamber at the end thereof opposite said reaction chamber; a substantially cylindrical refractory tube positioned within said reaction chamber and spaced apart from the walls thereof, the end of said tube nearest said inlet means being longitudinally remote from the inlet end of said reaction chamber; and carbon black recovery means in communication with said reaction chamber at the end thereof opposite said combustion chamber.

5. A reactor according to claim 4 wherein said tube is positioned coaxially with respect to the common axis of said combustion chamber and said reaction chamber.

6. A reactor according to claim 4, wherein the diameter of said reaction chamber is less than 6 inches and wherein the sum of the surface areas of the reaction chamber and of said tube is from 1.25 to 1.50 times the volume of said reaction chamber per foot of length thereof.

7. A reactor according to claim 4 wherein the internal diameter of said reaction chamber is at least 6 inches and the sum of the surface areas of the reaction chamber and of said refractory tube is from 0.8 to 1.0 times the volume of said reaction chamber per foot of length thereof.

8. A reactor according to claim 4 wherein said tube divides the cross-section of said reaction chamber into an annular portion and a central portion, the ratio of the area of said annular portion to the area of said central portion is in the range 0.5:1 to 3:1.

9. A reactor according to claim 4 wherein the distance from the inlet end of said reaction chamber to the nearest end of said tube is from 3 to 10% of the total length of said reaction chamber.

10. A process which comprises introducing an oxygen-containing gas tangentially into a cylindrical reaction zone, axially introducing into said zone a reactant hydrocarbon, contacting said oxygen-containing gas with said reactant hydrocarbon at an elevated temperature, thus forming a swirling mass of combustion gas which heats a part of said hydrocarbon to a carbon black forming temperature, dividing the resulting mixture into two streams, one within the other, passing said one stream along the interior of a cylindrical radiant surface, passing the other stream along the exterior of said surface, recombining said streams, and recovering carbon black from the resulting mixture.

11. A process according to claim 2 wherein said reactant hydrocarbon is an aromatic recycle gas oil.

12. A process wherein a hydrocarbon feed is converted to carbon black by pyrolysis, the improvement which comprises dividing a hydrocarbon gas, heated to a carbon black forming temperature, into two parts, one part being encompassed within the other part, passing said one part along the interior of a substantially tubular radiant surface, passing said other part along an exterior of a radiant surface corresponding to said interior, and recovering carbon black thus formed.

13. In a carbon black production reactor comprising a substantially cylindrical combustion chamber coaxially positioned adjacent and in open communication with a substantially cylindrical reaction chamber having a smaller diameter than said combustion chamber, said combustion chamber having at least one tangential inlet and an axial inlet and said reaction chamber having an outlet, the improvement comprising, in combination, a substantially nonobstructing and internally unobstructed cylindrical refractory tube positioned coaxially within said reaction chamber, downstream from said tangential inlet, and having open ends which are spaced from the ends of said reaction chamber and a periphery spaced from the periphery of said reaction chamber.

References Cited in the file of this patent

UNITED STATES PATENTS

| | | |
|---|---|---|
| 1,980,827 | Reed | Nov. 13, 1934 |
| 2,188,133 | Hepburn | Jan. 23, 1940 |
| 2,375,795 | Krejci | May 15, 1945 |
| 2,556,196 | Krejci | June 12, 1951 |
| 2,564,700 | Krejci | Aug. 21, 1951 |